United States Patent
Kitaguchi et al.

(10) Patent No.: US 10,124,774 B2
(45) Date of Patent: Nov. 13, 2018

(54) PEDAL DEVICE FOR VEHICLE

(71) Applicants: TOYODA IRON WORKS CO., LTD., Toyota-shi, Aichi (JP); KABUSHIKI KAISHA TOKAI RIKA DENKI SEISAKUSHO, Niwa-gun, Aichi (JP)

(72) Inventors: Kazuaki Kitaguchi, Toyota (JP); Masahide Masutani, Niwa-gun (JP); Takumi Fukaya, Niwa-gun (JP)

(73) Assignees: Toyoda Iron Works Co., Ltd., Toyota-shi, Aichi (JP); Kabushiki Kaisha Tokai Rika Denki Seisakusho, Niwa-gun, Aichi (JP)

( * ) Notice: Subject to any disclaimer, the term of this patent is extended or adjusted under 35 U.S.C. 154(b) by 0 days.

(21) Appl. No.: 15/511,441

(22) PCT Filed: Aug. 5, 2015

(86) PCT No.: PCT/JP2015/072290
§ 371 (c)(1),
(2) Date: Mar. 15, 2017

(87) PCT Pub. No.: WO2016/042938
PCT Pub. Date: Mar. 24, 2016

(65) Prior Publication Data
US 2017/0297542 A1 Oct. 19, 2017

(30) Foreign Application Priority Data
Sep. 19, 2014 (JP) .................................. 2014-191871

(51) Int. Cl.
*G05G 1/46* (2008.04)
*B60T 7/06* (2006.01)
(Continued)

(52) U.S. Cl.
CPC .................. *B60T 7/06* (2013.01); *G05G 1/44* (2013.01); *G05G 1/46* (2013.01); *G05G 5/05* (2013.01); *G01L 5/0057* (2013.01); *G01L 5/225* (2013.01)

(58) Field of Classification Search
CPC ... B60T 7/042; B60T 7/04; B60T 7/02; B60T 17/221; B60T 17/22; G05G 1/38;
(Continued)

(56) References Cited

U.S. PATENT DOCUMENTS 6,276,763 B1 8/2001 Isono et al.
7,134,327 B2 11/2006 Saito et al.
(Continued)

FOREIGN PATENT DOCUMENTS

CN 1701219 A 11/2005
EP 2615519 A1 7/2013
(Continued)

OTHER PUBLICATIONS

Office Action issued in Chinese Application No. 201580050069.8 dated Aug. 9, 2018.

Primary Examiner — Richard W Ridley
Assistant Examiner — Brian J McGovern
(74) Attorney, Agent, or Firm — Finnegan, Henderson, Farabow, Garrett & Dunner, LLP

(57) ABSTRACT

A vehicle pedal device including a transmission member that transmits an operation force applied to a pedal, a reaction force lever that is disposed on the transmission member so that the reaction force lever pivots about a predetermined axis, and that outputs the operation force transmitted to the transmission member to a brake device against a biasing force of a load spring, and a depressing force detector that is fixedly attached to a pedal arm of the pedal or to a sub lever coupled to the pedal arm and that receives a reaction
(Continued)

force of the reaction force lever to detect the operation force applied to the pedal, the depressing force detector being configured to have a positioning pin projecting from the depressing force detector, the pedal arm of the pedal or the sub lever coupled to the pedal arm being configured to have a positioning pin insertion hole in which the positioning pin of the depressing force detector is inserted, the depressing force detector being configured to be fixed to the pedal arm or the sub lever with the positioning pin being pressed against an inner peripheral edge of the positioning pin insertion hole by a reaction force of the load spring, and the load spring being fixedly positioned between the reaction force lever and the depressing force detector.

5 Claims, 7 Drawing Sheets

(51) Int. Cl.
*G05G 1/44* (2008.04)
*G05G 5/05* (2006.01)
*G01L 5/00* (2006.01)
*G01L 5/22* (2006.01)

(58) Field of Classification Search
CPC . G05G 1/30; G05G 1/44; G05G 1/445; G01L 5/0038; G01L 5/0028; G01L 5/0057; G01L 5/225
See application file for complete search history.

(56) References Cited

U.S. PATENT DOCUMENTS

| | | | |
|---|---|---|---|
| 9,740,233 B2* | 8/2017 | Fujiwara | G05G 1/44 |
| 2006/0162434 A1* | 7/2006 | Saito | B60T 7/042 73/132 |
| 2008/0223171 A1* | 9/2008 | Fujiwara | G01L 1/2237 74/512 |
| 2017/0284878 A1* | 10/2017 | Nagai | G01L 1/22 |

FOREIGN PATENT DOCUMENTS

| | | |
|---|---|---|
| JP | 11-227601 | 8/1999 |
| JP | 2000-198429 | 7/2000 |
| JP | 2011-018276 A | 1/2011 |
| JP | 2014-021791 A | 2/2014 |

* cited by examiner

PEDAL DEVICE FOR VEHICLE

CROSS-REFERENCE TO RELATED APPLICATIONS

This application is a national phase application of International Application No. PCT/JP2015/072290, filed Aug. 5, 2015, and claims the priority of Japanese Application No. 2014-191871, filed Sep. 19, 2014, the content of both of which is incorporated herein by reference.

TECHNICAL FIELD

The present invention relates to technologies that, in vehicle pedal devices including a transmission member that transmits an operation force applied to a pedal and a depressing force detector attached to the transmission member, restrain variation in attachment position of the depressing force detector to the transmission member.

BACKGROUND ART

Vehicle pedal devices are known in the art which include (a) a transmission member that transmits an operation force applied to a pedal, (b) a reaction force lever that is disposed on the transmission member so that the reaction force lever can pivot about a predetermined axis, and that outputs the operation force transmitted to the transmission member to a brake device against a biasing force of a load spring, and (c) a depressing force detector that is fixedly attached to a pedal arm of the pedal and that receives a reaction force of the reaction force lever to detect the operation force applied to the pedal. Examples of such vehicle pedal devices include brake pedal devices described in Patent Documents 1 and 2. In the brake pedal device shown in FIG. 14 of Patent Document 1, the depressing force detector is attached to an attachment bracket provided on a pedal arm serving as the transmission member, e.g., via a fastening device comprised of a bolt and a nut, by welding, etc. The load spring is attached between the attachment bracket and the tip end of the reaction force lever.

RELATED ART DOCUMENTS

Patent Documents

Patent Document 1: Japanese Patent Application Publication No. H11-227601
Patent Document 2: Japanese Patent Application Publication No. 2000-198429

SUMMARY OF THE INVENTION

Problem to be Solved by the Invention

Such a brake pedal device has the following problems. Due to variation in position of the attachment bracket with respect to the pedal arm and variation in position of the depressing force detector with respect to the attachment bracket which is caused by, e.g., the fastening device comprised of a bolt and a nut, welding, etc. that is used to attach the depressing force detector to the attachment bracket, accuracy of the attachment position of the depressing force detector to the pedal arm is reduced, and a position at which the tip end of a detection shaft projecting from the depressing force detector contacts the tip end of the reaction force lever, namely a detection start point, is displaced. Moreover, due to the variation in position of the attachment bracket with respect to the pedal arm, accuracy of the attachment position of the load spring to the pedal arm is reduced, and a load that is applied from the reaction force lever via the load spring to the detection shaft projecting from the depressing force detector, namely a detection load, deviates from a predetermined value.

For example, the brake pedal device of Patent Document 2, a brake pedal device 100 shown in FIG. 9, etc. are proposed as solutions to such problems. For example, the brake pedal device 100 shown in FIG. 9 includes: a detection start point adjusting mechanism 114 that is provided on the tip end of a reaction force lever 106 pivotally disposed on a slab lever 104, i.e., a transmission member, coupled to a pedal arm 102 and that is comprised of, e.g., an adjusting bolt 108, a weld nut 110, a double lock nut 112, etc.; and a detection load adjusting mechanism 124 that is provided on a support bracket 116 fixed to the sub lever 104 and that is comprised of, e.g., an adjusting bolt 118, a weld nut 120, a double lock nut 122, etc. In the detection start point adjusting mechanism 114, an engagement portion 108a provided at the tip end of the adjusting bolt 108 is moved in the axial direction of the adjusting bolt 108 to adjust the detection start point at which the tip end of a detection shaft 126a of a depressing force detector 126 contacts the tip end of the reaction force lever 106, namely the engagement portion 108a of the adjusting bolt 108. In the detection load adjusting mechanism 124, an engagement portion 118a provided at the tip end of the adjusting bolt 118 is moved in the axial direction of the adjusting bolt 118 to adjust the position of a load spring 128 and thus adjust the detection load.

However, since such a brake pedal device 100 has the detection start point adjusting mechanism 114 that adjusts the detection start point and the detection load adjusting mechanism 124 that adjusts the detection load, the brake pedal device 100 is disadvantageous in that it requires a larger number of components and in that adjustment operation is required to adjust the detection start point adjusting mechanism 114 and the detection load adjusting mechanism 124.

The present invention was developed in view of the above circumstances and it is an object of the present invention to provide a vehicle pedal device that restrains displacement of a detection start point and deviation of a detection load in a preferable manner as compared to conventional examples without providing a detection start point adjusting mechanism and a detection load adjusting mechanism.

Solution to Problem

To achieve the above object, the principle of the present invention provides a vehicle pedal device including (a) a transmission member that transmits an operation force applied to a pedal, a reaction force lever that is disposed on the transmission member so that the reaction force lever pivots about a predetermined axis, and that outputs the operation force transmitted to the transmission member to a brake device against a biasing force of a load spring, and a depressing force detector that is fixedly attached to a pedal arm of the pedal or to a sub lever coupled to the pedal arm and that receives a reaction force of the reaction force lever to detect the operation force applied to the pedal, characterized in that (b) the depressing force detector has a positioning pin projecting from the depressing force detector, (c) the pedal arm of the pedal or the sub lever coupled to the pedal arm has a positioning pin insertion hole in which the positioning pin of the depressing force detector is inserted, (d) the depressing force detector is fixed to the pedal arm or the sub lever with the positioning pin being pressed against an inner peripheral edge of the positioning pin insertion hole by a reaction force of the load spring, and (e) the load spring is fixedly positioned between the reaction force lever and the depressing force detector.

Advantageous Effects of the Invention

According to the vehicle pedal device configured as described above, (b) the depressing force detector has the positioning pin projecting therefrom, (c) the pedal arm of the pedal or the sub lever coupled to the pedal arm has the positioning pin insertion hole in Which the positioning pin of the depressing force detector is inserted, (d) the depressing force detector is fixed to the pedal arm or the sub lever with the positioning pin being pressed against the inner peripheral edge of the positioning pin insertion hole by the reaction force of the load spring, and (e) the load spring is fixedly positioned between the reaction force lever and the depressing force detector. In the case where the position where the positioning pin is pressed against the inner peripheral edge of the positioning pin insertion hole of the pedal arm or the sub lever coupled to the pedal arm is set as the attachment position of the depressing force detector to the pedal arm or the sub lever, the depressing force detector is more accurately attached to the pedal arm or the sub lever as compared to conventional examples. The load spring is thus fixedly positioned between the depressing force detector accurately attached to the pedal arm or the sub lever and the reaction force lever. Accordingly, in the case where the attachment position of the load spring to the pedal arm or the sub lever is set based on the position of the depressing force detector, the load spring is more accurately attached to the pedal arm or the sub lever as compared to conventional examples. Since the depressing force detector and the load spring are thus more accurately attached to the pedal arm or the sub lever as compared to conventional examples, displacement of the detection start point and deviation of the detection load can be restrained in a preferable manner as compared to conventional examples without providing the detection start point adjusting mechanism and the detection load adjusting mechanism.

Preferably, (a) the load spring is a coil spring, and (b) the load spring is placed on an outer periphery side of a detection shaft projecting from the depressing force detector so that the load spring is coaxial with an axis of the detection shaft and so that the load spring is fixedly positioned between the reaction force lever and the depressing force detector. Accordingly, space for the load spring and the detection shaft which are disposed between the reaction three lever and the depressing force detector can be reduced in a preferable manner.

Moreover, preferably, (a) the load spring is placed at a different position from an axis of a detection shaft projecting from the depressing force detector so that the load spring is parallel to the axis of the detection shaft and so that the load spring is fixedly positioned between the reaction force lever and the depressing force detector. The load spring therefore does not interfere with the detection shaft even if the load spring is deflected. Accordingly, the load spring can be selected from the types of springs, e.g., other than a coil spring.

Moreover, preferably, the positioning pin insertion hole has a circular or elliptical shape. Accordingly, the positioning pin being pressed against the inner peripheral edge of the positioning pin insertion hole by the reaction force of the load spring is allowed to move in the direction perpendicular to the direction in which the positioning pin is pressed by the reaction force of the load spring. The positioning pin is therefore not subjected to a relatively excessive load.

Moreover, preferably, (a) the positioning pin insertion hole has a polygonal shape, and (b) the positioning pin is pressed by the load spring and is thus pressed toward a vertex part of the polygonal shape. Accordingly, the positioning pin being pressed against the inner peripheral edge of the positioning pin insertion hole by the reaction force of the load spring is pressed toward the vertex part of the polygonal shape. The positioning pin is therefore less likely to move in the direction perpendicular to the direction in which the positioning pin is pressed by the reaction force of the load spring. The depressing force detector is thus accurately attached to the pedal arm or the sub lever in a preferable manner.

MODES FOR CARRYING OUT THE INVENTION

Figure 1:
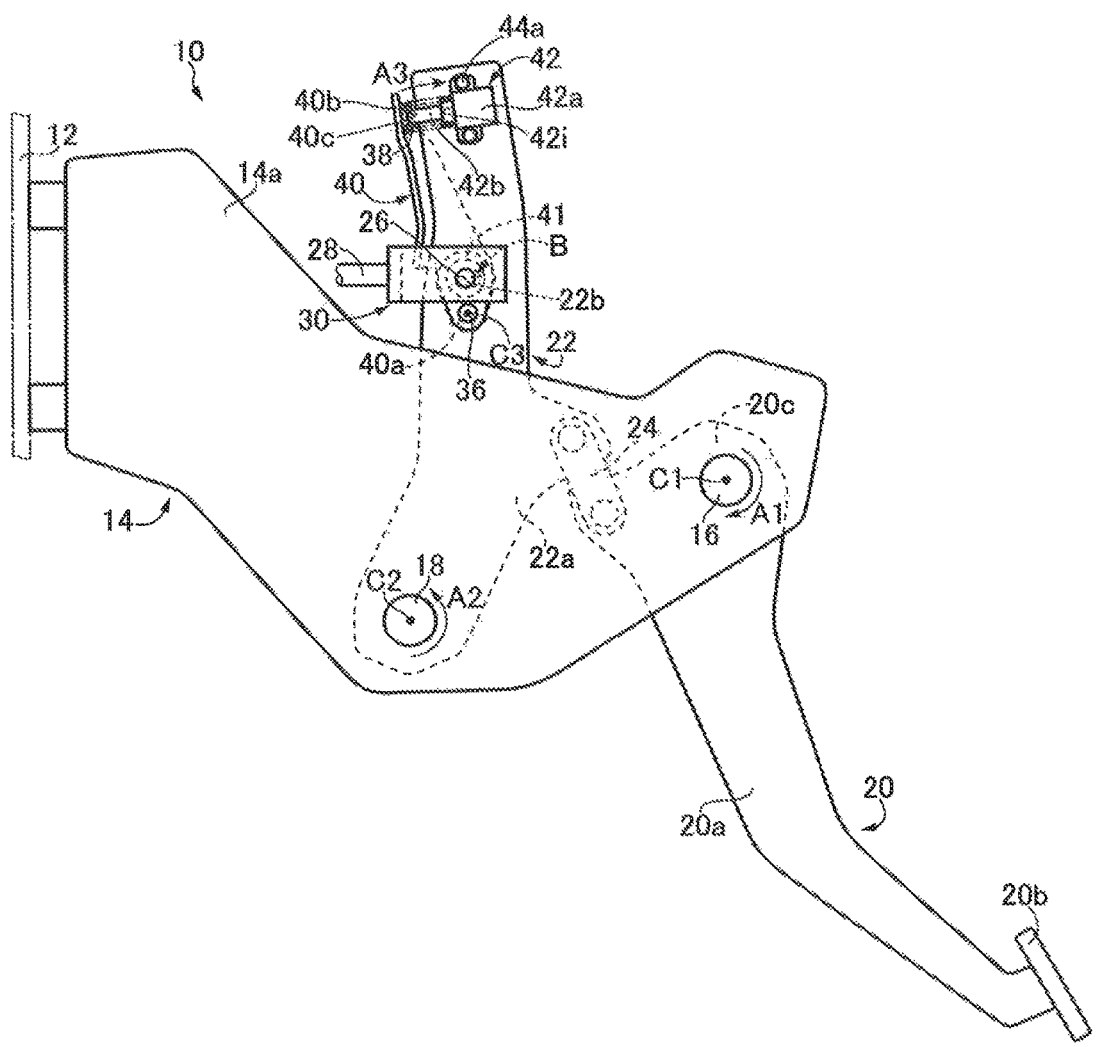
FIG. 1 is a front view showing a brake pedal device to which the present invention is applied.

Embodiments of the present invention will be described in detail below with reference to the accompanying drawings. In the following embodiments, the drawings are shown simplified or deformed as appropriate, and the proportions, shapes, etc. of the parts are not necessarily accurately shown in the drawings.

First Embodiment

FIG. 1 is a front view showing a brake pedal device (vehicle pedal device) 10 for a service brake to which the present invention is applied. As shown in FIG. 1, the brake pedal device 10 includes: a main bracket 14 that is attached to a dash panel 12 separating an engine compartment from a passenger compartment and that has a pair of plate-shaped side plates 14a facing each other; a shaft-shaped first shaft member 16 and a shaft-shaped second shaft member 18, each disposed between the pair of side plates 14a of the main bracket 14 and each having its both ends fixed to the pair of side plates 14a; a longitudinal brake pedal (pedal) 20 supported so that it can pivot about a first axis C1 of the first shaft member 16; a stepping portion 20b that is formed integrally with a longitudinal flat plate-shaped pedal arm 20a of the brake pedal 20 at the opposite end of the pedal arm 20a from the first shaft member 16 and that is depressed when a driver performs a braking operation; a longitudinal flat plate-shaped sub lever (transmission member) 22 supported so that it can pivot about a second axis C2 of the second shaft member 18; and coupling members 24 that are placed on both sides (front and back sides in FIG. 1) of both an end 22a on the first shaft member 16 side of the sub lever 22 and an end 20c on the second shaft member 18 side of the pedal arm 20a so that the coupling members 24 sandwich the ends 20c, 22a therebetween and extend between the ends 20c, 22a to link the pedal arm 20a and the sub lever 22. A first coupling pin 26 substantially parallel to the second shaft member 18 is fitted in an attachment hole 22b formed at an intermediate position in the sub lever 22 so that the first coupling pin 26 can rotate about its axis. An operating rod 28 that projects from a brake booster, not shown, into the passenger compartment is coupled via a clevis 30 to the first coupling pin 26, namely to the sub lever 22. The sub lever 22 is coupled to the end 20c of the pedal arm 20a via the coupling members 24 and serves as the transmission member that transmits an operation force applied to the brake pedal 20 by driver's braking operation.

Accordingly, as shown in FIG. 1, when the driver depresses the stepping portion 20b of the brake pedal 20 by the braking operation and the brake pedal 20 pivots in the direction shown by an arrow A1 about the first axis C1 of the first shaft member 16, the sub lever 22 pivots in the direction shown by an arrow A2 about the second axis C2 of the second shaft member 18 via the coupling members 24 coupled to the end 20c of the brake pedal 20, and the operating rod 28 is mechanically pressed accordingly. A brake oil pressure according to the depressing operation force applied to the brake pedal 20 is thus generated from a master cylinder, not shown.

As shown in FIG. 1, the brake pedal device 10 further includes: a reaction force lever 40 that is disposed on the sub lever 22 so that it can rotate about a third axis (predetermined axis) C3 of a columnar second coupling pin 36 disposed through the sub lever 22 and that outputs the operation force transmitted to the sub lever 22 to the brake booster (brake device), not shown, against a biasing force of a load spring 38; and a depressing force detector 42 that is fixed to the sub lever 22 and that receives a reaction force of the reaction force lever 40 to detect the operation force applied to the brake pedal 20.

Figure 2:
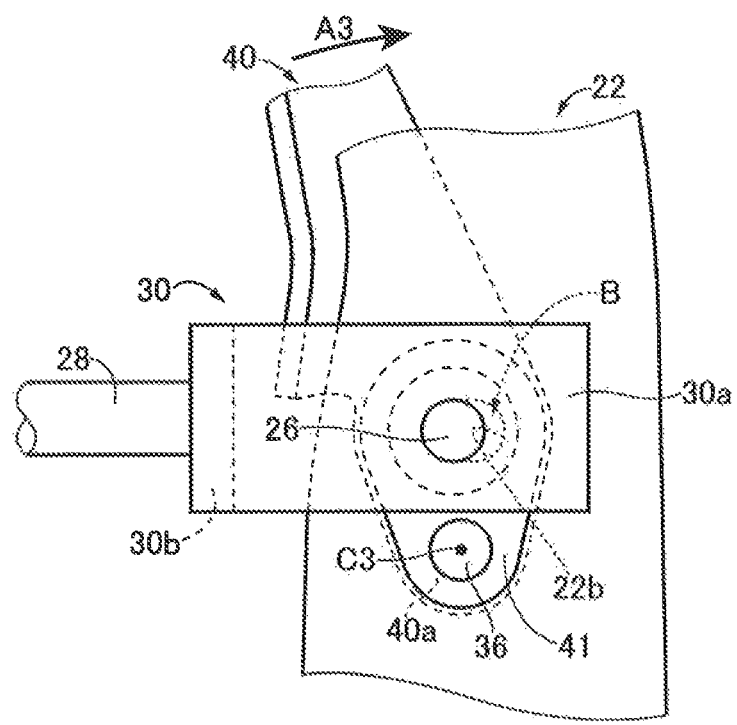
FIG. 2 is an enlarged view of a portion around a clevis disposed over a sub lever of the brake pedal device in FIG. 1.

As shown in FIG. 2, the clevis 30 includes a pair of longitudinal flat plate-shaped sidewall portions 30a facing each other and a joint portion 30b joining the ends on the operating rod 28 side of the pair of sidewall portions 30a. The operating rod 28 is coupled to the joint portion 30b of the clevis 30. A base end 40a of the reaction force lever 40 and a coupling plate 41 are disposed between the pair of sidewall portions 30a of the clevis 30, and a part of the sub lever 22 is disposed between the base end 40a of the reaction force lever 40 and the coupling plate 41. Opposite ends of the second coupling pin 36 are fitted in the base end 40a of the reaction force lever 40 and the coupling plate 41, respectively, so that the second coupling pin 36 cannot rotate relative to the base end 40a of the reaction force lever 40 and the coupling plate 41. The part of the sub lever 22 is fitted on an intermediate part of the second coupling pin 36 so that the sub lever 22 can rotate relative to the intermediate part of the second coupling pin 36. The base end 40a of the reaction force lever 40, the part of the sub lever 22, and the coupling plate 41 are fitted on the first coupling pin 26 having its opposite ends coupled to the pair of sidewall portions 30a of the clevis 30 so that the reaction force lever 40, the sub lever 22, and the coupling plate 41 can rotate relative to the first coupling pin 26. As shown in FIG. 2, there is clearance B between the attachment hole 22b of the sub lever 22 and the first coupling pin 26 disposed through the attachment hole 22b. Accordingly, when the sub lever 22 pivots about the second axis C2 of the second shaft member 18 in response to driver's braking operation and the operation force of the braking operation increases, the sub lever 22 reduces the clearance B between the attachment hole 22b of the sub lever 22 and the first coupling pin 26 according to the increase in operation force. That is, as shown in FIGS. 1 to 3, when considered based on the sub lever 22, the reaction force lever 40 pivots in the direction shown by an arrow A3 about the third axis C3 of the second coupling pin 36 against the biasing force of the load spring 38 according to the increase in operation force so that a tip end 40b of the reaction force lever 40 moves toward the depressing force detector 42 fixed to the sub lever 22.

Figure 3:
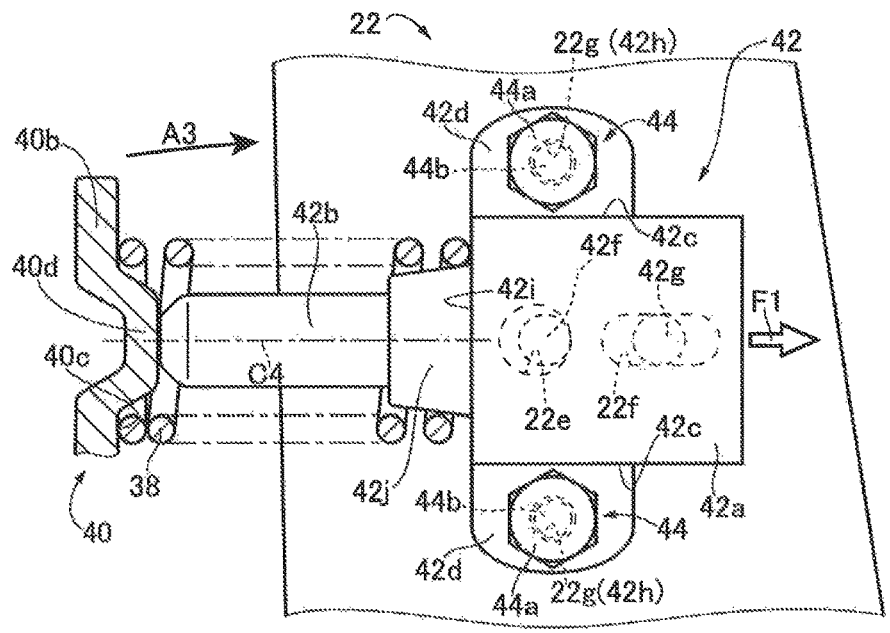
FIG. 3 is a view illustrating the configuration of a depressing force detector disposed on the sub lever of the brake pedal device in FIG. 1.

As shown in FIG. 3, the depressing force detector 42 includes a housing 42a and a detection shaft 42b having the shape of a shaft and projecting from the housing 42a, and detects the magnitude of the operation force of driver's braking operation based on a load applied to the detection shaft 42b or displacement of the detection shaft 42b in the direction of an axis C4 of the detection shaft 42b. For example, the housing 42a accommodates the detection shaft 42b so that the detection shaft 42b can move in the direction of the axis C4, and biases the detection shaft 42b by a spring, not shown, disposed in the housing 42a in such a direction that the detection shaft 42b projects from the housing 42a.

Figure 4:
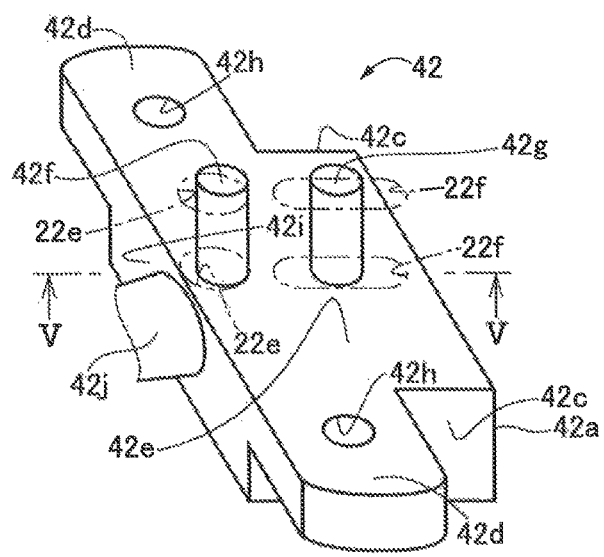
FIG. 4 is a perspective view of the depressing force detector in FIG. 3, showing the seating surface side of the depressing force detector which is seated on the sub lever.

As shown in FIGS. 3 and 4, the depressing force detector 42 further includes: fixed portions 42d that project from both side surfaces 42c of the housing 42a and fix the housing 42a, namely the depressing force detector 42, to the sub lever 22 via a pair of fastening devices 44; and a columnar first pin (positioning pin) 42f and a columnar second pin 42g which, when the fixed portions 42d are fixed by the fastening devices 44, project from a seating surface 42e (see FIG. 4) of the housing 42a seated on the sub lever 22 into a positioning hole (positioning pin insertion hole) 22e and a guide hole 22f in the sub lever 22 described below, respectively. For example, each fastening device 44 is comprised of a bolt 44a and a threaded hole 22g formed in the sub lever 22. Shaft portions 44b of the bolts 44a are inserted through through holes 42h extending through the fixed portions 42d of the housing 42a, and the bolts 44a are screwed and tightened into the threaded holes 22g formed in the sub lever 22, whereby the fixed portions 42d, namely the housing 42a, are fixed to the sub lever 22. The through hole 42h formed in each fixed portion 42d of the depressing force detector 42 is larger than the diameter of the shaft portion 44b of the bolt 44a of the fastening device 44.

Figure 5:
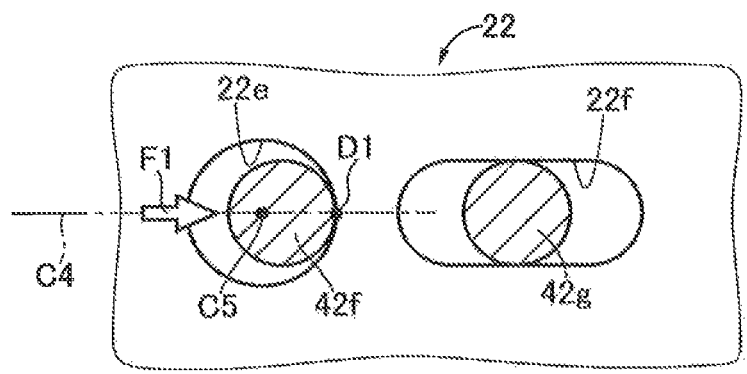
FIG. 5 is a sectional view taken along line V-V and viewed in the direction of arrows V in FIG. 4.

As shown in FIGS. 3 to 5, the sub lever 22 has the positioning hole 22e in which the first pin 42f formed on the housing 42a of the depressing force detector 42 is inserted, and the guide hole 22f in which the second pin 42q formed on the housing 42a is inserted.

As shown in FIG. 5, the positioning hole 22e formed in the sub lever 22 has a circular shape with a diameter larger than that of the circular section of the columnar first pin 42f, and is formed so that the center C5 of the circular positioning hole 22e is located on the axis C4 of the detection shaft 42b of the depressing force detector 42. In the positioning hole 22e formed in the sub lever 22, a position D1 where the first pin 42f contacts the inner peripheral edge of the positioning hole 22e at a point closest to the guide hole 22f in the direction of the axis C4 of the detection shaft 42b is preset as an attachment position of the depressing force detector 42 to the sub lever 22. The guide hole 22f formed in the sub lever 22 is an elongated hole formed so that the columnar second pin 42g can slide therein in the longitudinal direction of the elongated hole, and formed so that the longitudinal direction of the elongated hole is substantially parallel to the direction of the axis C4 of the detection shaft 42b of the depressing force detector 42.

As shown in FIG. 3, the load spring 38 is a coil spring formed by winding a wire into a cylindrical form. The load spring 38 is placed on the outer periphery of the detection shaft 42b of the depressing force detector 42 so as to be interposed in a preloaded state between a first receiving surface 40c that is formed on the tip end 40b of the reaction force lever 40 in order to receive the end on the reaction force lever 40 side of the load spring 38 and a second receiving surface 42i that is formed on the housing 42a of the depressing force detector 42 in order to receive the end on the depressing force detector 42 side of the load spring 38. The first receiving surface 40c formed on the tip end 40b of the reaction force lever 40 has a first seating portion 40d on which the end on the reaction force lever 40 side of the load spring 38 is seated so that the axis of the load spring 38 is substantially aliened with the axis C4 of the detection shaft 42b. The second receiving surface 42i formed on the housing 42a of the depressing force detector 42 has a second seating portion 42j on which the end on the depressing force detector 42 side of the load spring 38 is seated so that the axis of the load spring 38 is substantially aligned with the axis C4 of the detection shaft 42b. The load spring 38 is thus fixedly positioned between the tip end 40b of the reaction force lever 40 and the depressing force detector 42 by the first seating portion 40d and the second seating portion 42j so that the axis of the load spring 38 is substantially aligned with the axis C4 of the detection shaft 42b. Accordingly, when a reaction force of the load spring 38 is transmitted from the reaction force lever 40 to the depressing force detector 42, the depressing force detector 42 is pressed in the direction of the axis C4 of the detection shaft 42b of the depressing force detector 42, namely in the direction of an arrow F1.

An attachment method for attaching the depressing force detector 42 to the sub lever 22 will be described. First, the end on the depressing force detector 42 side of the load spring 38 is seated on the second seating portion 42j, and the depressing force detector 42 having the coil load spring 38 thus fitted on the outer periphery of the detection shaft 42b is attached so that the opposite end of the load spring 38 from the depressing force detector 42 is seated on the first seating portion 40d of the reaction force lever 40. Next, the shaft portions 44b of the bolts 44a are inserted through the through holes 42h in the fixed portions 42d of the depressing force detector 42, and the tip ends of the shaft portions 44b of the bolts 44a are screwed into the threaded holes 22g in the sub lever 22. The bolts 44a are loosely tightened so as to allow the shaft portions 44b of the bolts 44a to move in the through holes 42h of the fixed portions 42d of the depressing force detector 42, namely to allow the depressing force detector 42 to move within a predetermined range with respect to the sub lever 22. The depressing force detector 42 is then pressed in the direction of the arrow F1 by the biasing force of the load spring 38 transmitted from the reaction force lever 40. With the depressing force detector 42 being pressed in this manner, the bolts 44a are tightened so as not to allow the depressing force detector 42 to move with respect to the sub lever 22. The depressing force detector 42 is thus attached to the sub lever 22.

As shown in FIG. 5, when the depressing force detector 42 is pressed in the direction of the arrow F1, the second pin 42g formed on the depressing force detector 42 guides the depressing force detector 42 in the direction of the axis C4 of the detection shaft 42b along the inner peripheral edge of the guide hole 22f formed in the sub lever 22, and the first pin 42f formed on the depressing force detector 42 is pressed against the inner peripheral edge of the positioning hole 22e formed in the sub lever 22. The first pin 42f stops when it contacts the inner peripheral edge of the positioning hole 22e at the point closest to the guide hole 22f in the direction of the axis C4 of the detection shaft 42b. The positioning hole 22e of the sub lever 22 functions as a first stopper that stops the depressing force detector 42 at a predetermined position in the direction of the axis C4 of the detection shall 42b and as a second stopper that stops the depressing force detector 42 at a predetermined position in the direction perpendicular to the direction of the axis C4, when the first pin 42f is pressed against the inner peripheral edge of the positioning hole 22e.

As described above, according to the brake pedal device 10 of the present embodiment, the depressing force detector 42 has the first pin 42f projecting therefrom, and the sub lever 22 coupled to the pedal arm 20a of the brake pedal 20 has the positioning hole 22e in which the first pin 42f of the depressing force detector 42 is inserted. The depressing force detector 42 is fixed to the sub lever 22 with the first pin 42f being pressed against the inner peripheral edge of the positioning hole 22e by the reaction force of the load spring 38. The load spring 38 is fixedly positioned between the reaction force lever 40 and the depressing force detector 42. In the case where the position D1 where the first pin 42f is pressed against the inner peripheral edge of the positioning hole 22e of the sub lever 22 coupled to the pedal arm 20a is set as the attachment position of the depressing force detector 42 to the sub lever 22, the depressing force detector 42 is more accurately attached to the sub lever 22 as compared to conventional examples. The load spring 38 is thus fixedly positioned between the depressing force detector 42 accurately attached to the sub lever 22 and the reaction force lever 40. Accordingly, in the case where the attachment position of the load spring 38 to the sub lever 22 is set based on the position of the depressing force detector 42, the load spring 38 is more accurately attached to the sub lever 22 as compared to conventional examples. Since the depressing force detector 42 and the load spring 38 are thus more accurately attached to the sub lever 22 as compared to conventional examples, displacement of the detection start point and deviation of the detection load can be restrained in a preferable manner as compared to conventional examples without providing the detection start point adjusting mechanism 114 and the detection load adjusting mechanism 124.

According to the brake pedal device 10 of the present embodiment, the load spring 38 is a coil spring. The load spring 38 is placed on the outer periphery of the detection shaft 42b projecting from the depressing force detector 42 so that the load spring 38 is coaxial with the axis C4 of the detection shaft 42b and so that the load spring 38 is fixedly positioned between the reaction force lever 40 and the depressing force detector 42. Accordingly, space for the load spring 38 and the detection shaft 42b which are disposed between the reaction force lever 40 and the depressing force detector 42 can be reduced in a preferable manner.

According to the brake pedal device 10 of the present embodiment, the positioning hole 22e has a circular shape. Accordingly, the first pin 42f being pressed against the inner peripheral edge of the positioning hole 22e by the biasing force of the load spring 38 is allowed to move in the direction perpendicular to the direction of the arrow F1 in which the first pin 42f is pressed by the reaction force of the load spring 38. The first pin 42f is therefore not subjected to a relatively excessive load.

Other embodiments of the present invention will be described in detail below with reference to the drawings. In the following description, those portions common to different embodiments are denoted with the same reference characters, and description thereof will be omitted.

Second Embodiment

Figure 6:
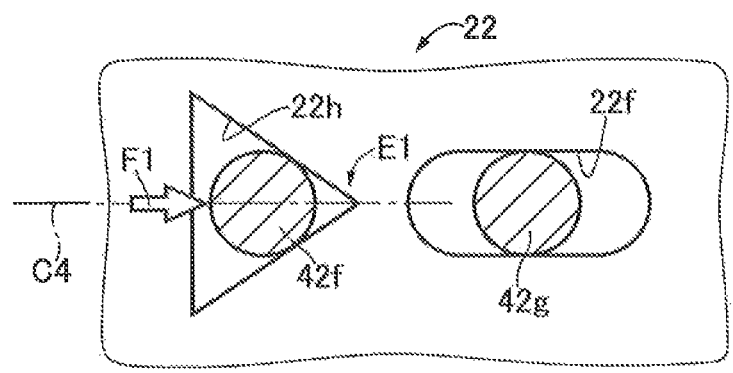
FIG. 6 is a view corresponding to FIG. 5, showing a brake pedal device of another embodiment of the present invention.

As shown in FIG. 6, in a brake pedal device (vehicle pedal device) of the present embodiment, the shape of a positioning hole (positioning pin insertion hole) 22h is different from that of the positioning hole 22e of the first embodiment. That is, the brake pedal device of the present embodiment is different from the brake pedal device 10 of the first embodiment in that the positioning hole 22h has a triangular (polygonal) shape. The brake pedal device of the present embodiment is otherwise substantially similar to the brake pedal device 10 of the first embodiment. As shown in FIG. 6, the triangular positioning hole 22h in the sub lever 22 is formed so that the bisector of a vertex angle (vertex part) E1 on the guide hole 22f side is aligned with the axis C4 of the detection shaft 42b of the depressing force detector 42. The first pin 42f is pressed in the direction of the arrow F1 by the load spring 38 and is thus pressed toward the vertex angle E1 of the triangular positioning hole 22h.

As described above, according to the brake pedal device of the present embodiment, the positioning hole 22h has a triangular shape, and the first pin 42f is pressed by the load spring 38 and is thus pressed toward the vertex angle E1 of the triangle. Accordingly, the first pin 42f being pressed against the inner peripheral edge of the positioning hole 22h by the reaction force of the load spring 38 is pressed toward the vertex angle E1 of the triangle. The first pin 42f is therefore less likely to move in the direction perpendicular to the direction of the arrow F1 in which the first pin 42f is pressed by the reaction force of the load spring 38. The depressing force detector 42 is thus accurately attached to the sub lever 22 in a preferable manner.

Third Embodiment

Figure 7:
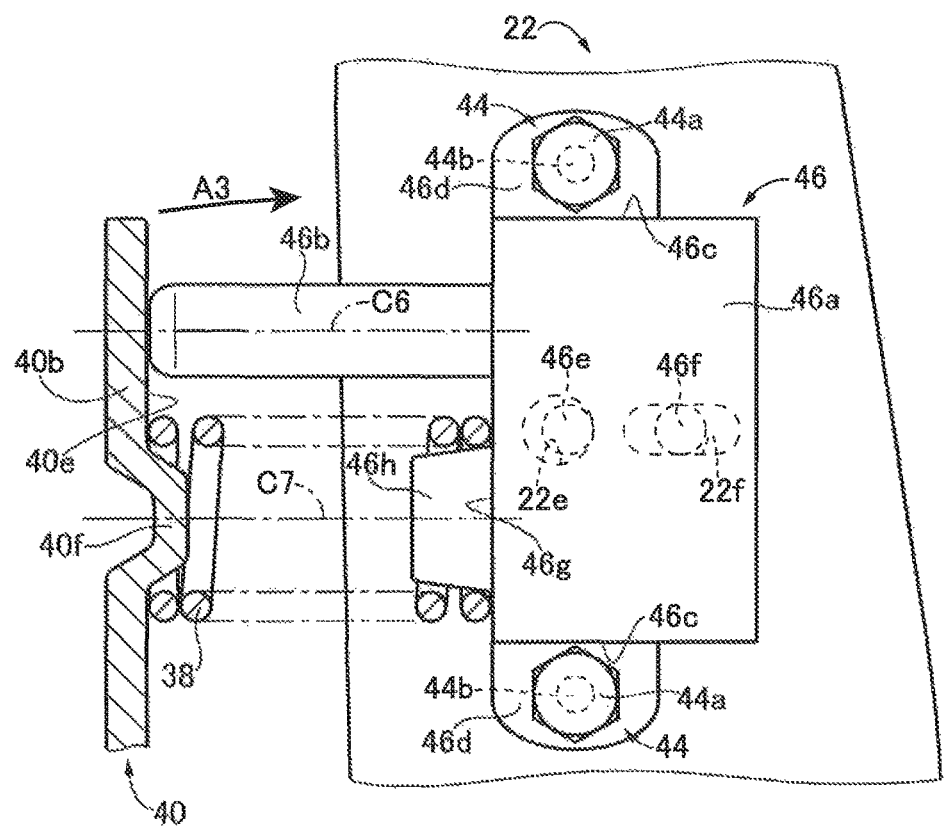
FIG. 7 is a view corresponding to FIG. 3, showing a brake pedal device of still another embodiment of the present invention.

As shown in FIG. 7, a brake pedal device (vehicle pedal device) of the present embodiment is different from the brake pedal device 10 of the first embodiment in the shape of the tip end 40b of the reaction force lever 40 and in that the shape of a depressing force detector 46 is different from that of the depressing force detector 42 of the first embodiment. The brake pedal device of the present embodiment is otherwise substantially similar to the brake pedal device 10 of the first embodiment.

As shown in FIG. 7, the depressing force detector 46 includes: a detection shaft 46b having the shape of a shaft and projecting from a housing 46a; fixed portions 46d that project from both side surfaces 46c of the housing 46a and fix the housing 46a, namely the depressing force detector 46, to the sub lever 22 via the pair of fastening devices 44; and a first pin 46e (positioning pin) and a second pin 46f which are similar to the first pin 42f and the second pin 42g of the first embodiment described above.

As shown in FIG. 7, the load spring 38 is placed at a different position from an axis C6 of the detection shaft 46b of the depressing force detector 46 so as to be substantially parallel to the axis C6 of the detection shaft 46b and to be interposed in a compressed state between a first receiving surface 40e that is formed on the tip end 40b of the reaction force lever 40 in order to receive the end on the reaction force lever 40 side of the load spring 38 and a second receiving surface 46g that is formed on the housing 46a of the depressing force detector 46 in order to receive the end on the depressing force detector 46 side of the load spring 38. The first receiving surface 40e formed on the tip end 40b of the reaction force lever 40 has a first seating portion 40f on which the end on the reaction force lever 40 side of the load spring 38 is seated so that an axis C7 of the load spring 38 is substantially parallel to the axis C6 of the detection shaft 46b. The second receiving surface 46g formed on the housing 46a of the depressing force detector 46 has a second seating portion 46h on which the end on the depressing force detector 46 side of the load spring 38 is seated so that the axis C7 of the load spring 38 is substantially parallel to the axis C6 of the detection shaft 46b. The load spring 38 is thus fixedly positioned between the tip end 40b of the reaction force lever 40 and the depressing force detector 46 by the first seating portion 40f and the second seating portion 46h so that the axis C7 of the load spring 38 is substantially parallel to the axis C6 of the detection shaft 46b.

As described above, according to the brake pedal device of the present embodiment, the load spring 38 is placed at a different position from the axis C6 of the detection shaft 46b projecting from the depressing force detector 46 so that the load spring 38 is substantially parallel to the axis C6 of the detection shaft 46b and so that the load spring 38 is fixedly positioned between the tip end 40b of the reaction force lever 40 and the depressing force detector 46. The load spring 38 therefore does not interfere with the detection shaft 46b even if the load spring 38 is deflected. Accordingly, the load spring 38 may be selected from the types of springs, e.g., other than a coil spring.

Fourth Embodiment

Figure 8:
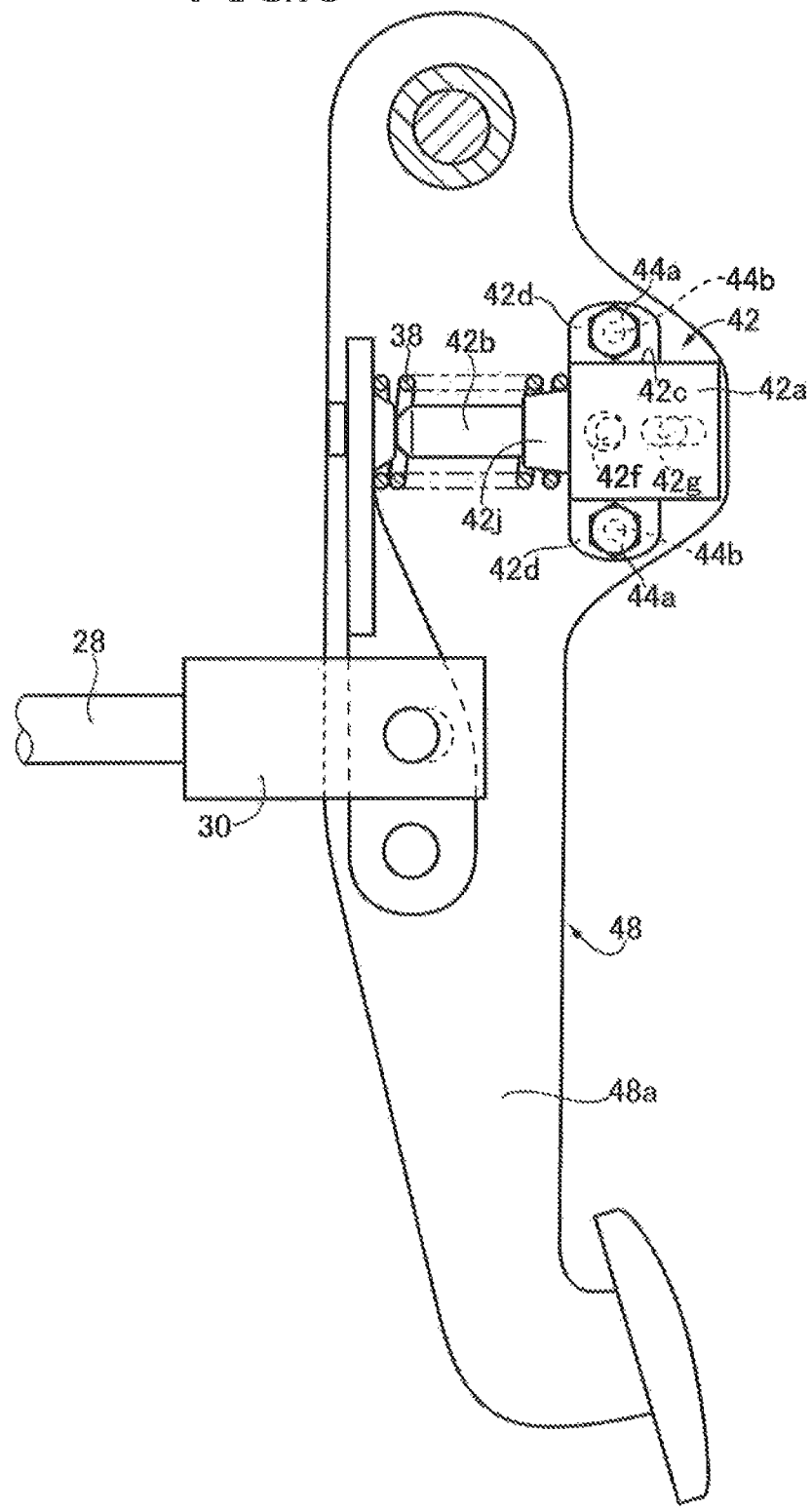
FIG. 8 is a view showing a brake pedal device of still another embodiment of the present invention in which the depressing force detector in FIG. 3 is fixedly attached to a pedal arm of a brake pedal.
Figure 9:
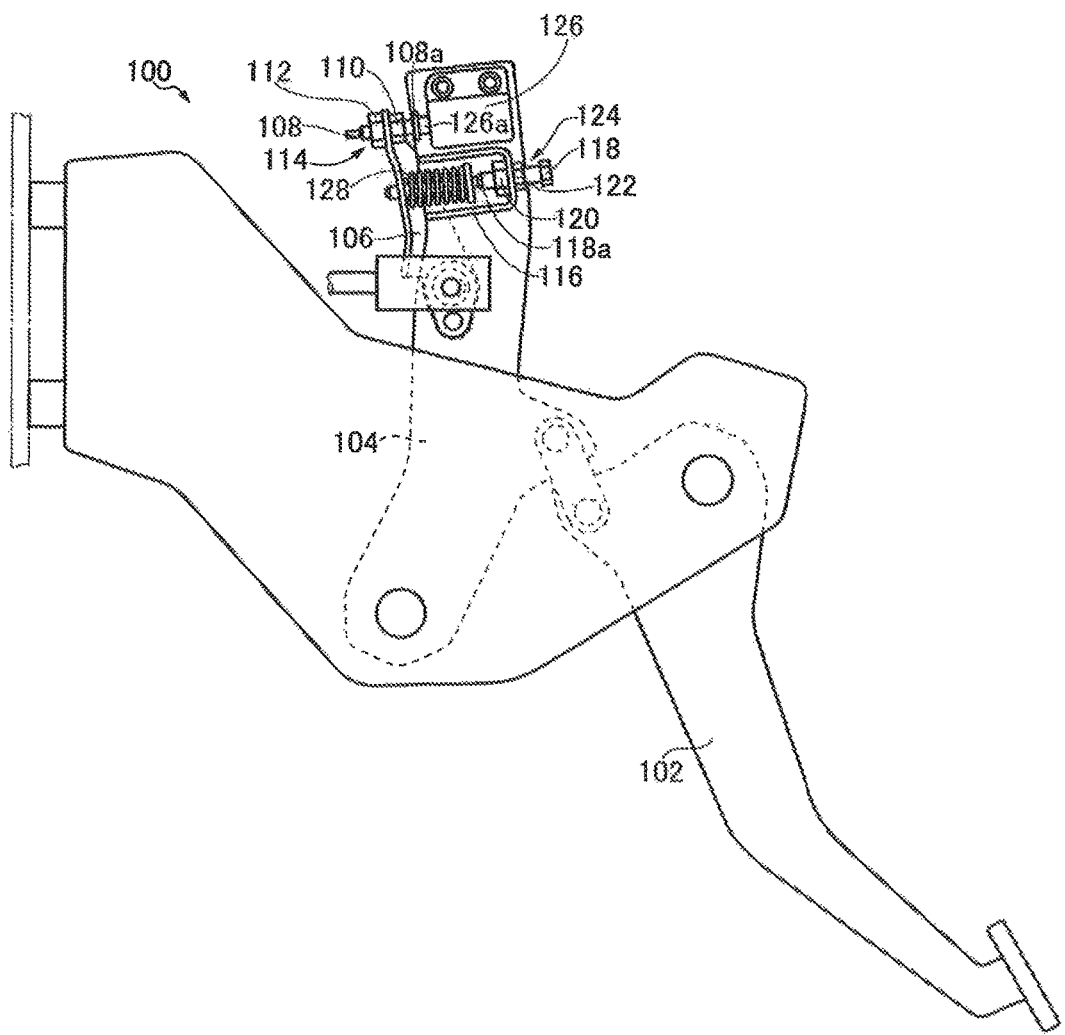
FIG. 9 is a view showing a brake pedal device including a detection start point adjusting mechanism and a detection load adjusting mechanism.

As shown in FIG. 8, a brake pedal device (vehicle pedal device) of the present embodiment is different from the brake pedal device 10 of the first embodiment in that the depressing force detector 42 of the first embodiment is fixedly attached to the sub lever 22 coupled to the pedal arm 20a of the brake pedal 20 via the coupling members 24, whereas the depressing force detector 42 of the present embodiment is fixedly attached directly to a pedal arm (transmission member) 48a of a brake pedal 48. The brake pedal device of the present embodiment is otherwise substantially similar to the brake pedal device 10 of the first embodiment.

Although the embodiments of the present invention are described in detail above with reference to the drawings, the present invention is also applicable to other forms.

In the first embodiment and the third embodiment, the positioning hole 22e formed in the sub lever 22 has a circular shape. However, the positioning hole 22e may have, e.g., an elliptical shape. In the second embodiment, the positioning hole 22h formed in the sub lever 22 has a triangular shape. However, the positioning hole 22h may have any polygonal shape other than the triangular shape which can provide accurate positioning by the biasing force of the load spring 38, such as, e.g., a quadrilateral or pentagonal shape.

In the first to third embodiments, the depressing force detector 42, 46 has the second pin 42g, 46f, and the sub lever 22 has the guide hole 22f in which the second pin 42g, 46f formed on the depressing force detector 42, 46 slides. However, the second pin 42g, 46f and the guide hole 22f need not necessarily be formed.

In the embodiments, the depressing force detector 42, 46 detects the magnitude of an operation force of driver's braking operation. However, the depressing force detector 42, 46 may be, e.g., a switch that detects an operation force of driver's braking operation to determine if there is a braking operation.

The above embodiments of the present invention are shown by way of example only, and the present invention can be embodied in various modified or improved forms based on the knowledge of those skilled in the art.

REFERENCE SIGNS LIST

10: Brake pedal device (Vehicle pedal device)
20: Brake pedal (Pedal)
20a: Pedal arm
22: Sub lever (Transmission member)
22e, 22h: Positioning hole (Positioning pin insertion hole)
38: Load spring
40: Reaction force lever
42, 46: Depressing force detector

The invention claimed is:

1. A vehicle pedal device including a transmission member that transmits an operation force applied to a stepping portion, a reaction force lever that is disposed on the transmission member so that the reaction force lever pivots about a predetermined axis, and that is configured to output the operation force transmitted to the transmission member to an operating rod against a force of a load spring, and a depressing force detector that is fixedly attached to the transmission member, the depressing force detector receiving a reaction force of the reaction force lever to detect the operation force applied to the stepping portion, the depressing force detector being configured to have a positioning pin projecting from the depressing force detector, the transmission member having a positioning pin insertion hole in which the positioning pin of the depressing force detector is inserted, the depressing force detector being configured to be fixed to the transmission member with the positioning pin being pressed against an inner peripheral edge of the positioning pin insertion hole by the force of the load spring, an axial center axis of the positioning pin being offset relative to a center axis of the positioning pin insertion hole, the center axis of the positioning pin insertion hole being parallel to the axial center axis of the positioning pin, and the load spring being fixedly positioned between the reaction force lever and the depressing force detector.

2. The vehicle pedal device according to claim 1, wherein the load spring is a coil spring, and
the load spring is placed on an outer periphery side of a detection shaft projecting from the depressing force detector so that the load spring is coaxial with an axis of the detection shaft and so that the load spring is fixedly positioned between the reaction force lever and the depressing force detector.

3. The vehicle pedal device according to claim 1, wherein the load spring is placed at a different position from an axis of a detection shaft projecting from the depressing force detector so that the load spring is parallel to the axis of the detection shaft and so that the load spring is fixedly positioned between the reaction force lever and the depressing force detector.

4. The vehicle pedal device according to claim 1, wherein the positioning pin insertion hole has a circular or elliptical shape.

5. The vehicle pedal device according to claim 1, wherein the positioning pin insertion hole has a polygonal shape, and
the positioning pin is pressed by the load spring and is thus pressed toward a vertex part of the polygonal shape.

* * * * *